United States Patent
Yoshino et al.

(10) Patent No.: US 9,376,959 B2
(45) Date of Patent: Jun. 28, 2016

(54) FOIL BEARING

(71) Applicants: Masato Yoshino, Mie (JP); Hiroki Fujiwara, Mie (JP)

(72) Inventors: Masato Yoshino, Mie (JP); Hiroki Fujiwara, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/652,973

(22) PCT Filed: Dec. 16, 2013

(86) PCT No.: PCT/JP2013/083556
§ 371 (c)(1),
(2) Date: Jun. 17, 2015

(87) PCT Pub. No.: WO2014/098005
PCT Pub. Date: Jun. 26, 2014

(65) Prior Publication Data
US 2015/0337894 A1    Nov. 26, 2015

(30) Foreign Application Priority Data

Dec. 19, 2012  (JP) ................................. 2012-276905
Dec. 19, 2012  (JP) ................................. 2012-276907

(51) Int. Cl.
*F16C 32/06*    (2006.01)
*F02C 3/08*     (2006.01)
(Continued)

(52) U.S. Cl.
CPC . *F02C 3/08* (2013.01); *F01D 25/16* (2013.01); *F01D 25/166* (2013.01); *F02C 7/06* (2013.01);
(Continued)

(58) Field of Classification Search
CPC .................................................. F16C 17/024

USPC ............................................ 384/103, 104, 106
See application file for complete search history.

(56) References Cited

U.S. PATENT DOCUMENTS

| 3,343,762 A * | 9/1967 | Marley ................... B21C 47/16 |
| | | 242/562.1 |
| 3,434,762 A * | 3/1969 | Marley ................. F16C 17/024 |
| | | 384/103 |

(Continued)

FOREIGN PATENT DOCUMENTS

| EP | 0068387 A1 * | 1/1983 | ............ F16C 17/024 |
| JP | 0068387 A1 * | 1/1983 | ............ F16C 17/024 |

(Continued)

OTHER PUBLICATIONS

International Search Report issued Jan. 28, 2014 in International (PCT) Application No. PCT/JP2013/083556.
(Continued)

*Primary Examiner* — Phillip A Johnson
(74) *Attorney, Agent, or Firm* — Wenderoth, Lind & Ponack, L.L.P.

(57) ABSTRACT

A foil bearing includes an outer member (11), and a plurality of foils (13) that are mounted to an inner circumferential surface (11a) of the outer member (11) and directly face the inner circumferential surface (11a) of the outer member (11) in a radial direction without interposition of another member (such as back foils). The foils (13) each include: holding portions (13a, 13b) that are formed at both circumferential ends and held while in contact with the outer member (11); and a body portion (13c) that is formed circumferentially between the holding portions (13a, 13b) and has a bearing surface (A). At least an end portion on one side in a circumferential direction of the body portion (13c) is raised radially inward with respect to the inner circumferential surface (11a) of the outer member (11).

11 Claims, 10 Drawing Sheets

(51) Int. Cl.
- *F16C 17/02* (2006.01)
- *F02C 7/08* (2006.01)
- *F01D 25/16* (2006.01)
- *F16C 43/02* (2006.01)
- *F02C 7/06* (2006.01)
- *F16C 27/02* (2006.01)

(52) U.S. Cl.
CPC ............... *F02C 7/08* (2013.01); *F16C 17/024* (2013.01); *F16C 27/02* (2013.01); *F16C 32/0607* (2013.01); *F16C 43/02* (2013.01); *F05D 2220/40* (2013.01); *F16C 2360/24* (2013.01)

(56) References Cited

U.S. PATENT DOCUMENTS

| | | | | |
|---|---|---|---|---|
| 4,815,864 A | * | 3/1989 | Jones | F16C 17/024 384/103 |
| 5,915,841 A | * | 6/1999 | Weissert | F16C 43/02 384/104 |
| 6,135,460 A | * | 10/2000 | Nadjafi | B01D 53/04 210/263 |
| 2007/0211970 A1 | | 9/2007 | Nagata et al. | |
| 2011/0103725 A1 | | 5/2011 | Omori | |

FOREIGN PATENT DOCUMENTS

| | | |
|---|---|---|
| JP | 59-35723 | 3/1984 |
| JP | 2002-364643 | 12/2002 |
| JP | 2003-262222 | 9/2003 |
| JP | 2004-190762 | 7/2004 |
| JP | 2006-57828 | 3/2006 |
| JP | 2006-177542 | 7/2006 |
| JP | 2007-239962 | 9/2007 |
| JP | 2009-216239 | 9/2009 |
| JP | 2009-299748 | 12/2009 |

OTHER PUBLICATIONS

English translation of the International Preliminary Report on Patentability (Chapter I), issued Jun. 23, 2015, for Application No. PCT/JP2013/083556.

* cited by examiner

FOIL BEARING

TECHNICAL FIELD

The present invention relates to a foil bearing.

BACKGROUND ART

Main shafts of a gas turbine and a turbocharger are driven to rotate at high speed. Further, turbine blades mounted to the main shafts are exposed to high temperature. Thus, bearings for supporting those main shafts are required to endure severe environments involving high temperature and high speed rotation. As bearings for such use, an oil-lubricated rolling bearing or a hydraulic dynamic pressure bearing may be used. However, use of those bearings is restricted under such conditions that lubrication with a liquid such as a lubricating oil is difficult, that an auxiliary device of a lubricating oil circulatory system is difficult to arrange separately in view of energy efficiency, and that shearing resistance of the liquid causes problems. Under the circumstance, attention has been focused on an air dynamic pressure bearing as a bearing suited to use under the above-mentioned conditions.

In general, the air dynamic pressure bearing has rigid bearing surfaces on both of a rotary side and a fixed side. However, in the air dynamic pressure bearing of this type, when stability limit is exceeded under a state in which management of radial bearing gaps that are formed between the bearing surfaces on the rotary side and the fixed side is insufficient, self-excited centrifugal whirling of a main shaft, which is called a whirl, is liable to occur. Thus, it is important to manage the gaps in accordance with operating rotation speeds. In particular, in environments involving drastic temperature changes as in the case of the gas turbine and the turbocharger, widths of the radial bearing gaps fluctuate due to thermal expansion, and hence the gaps are significantly difficult to manage with high accuracy.

There has been known a foil bearing as a bearing that is less liable to cause the whirl and allows the gaps to be easily managed even in the environments involving drastic temperature changes. The foil bearing has bearing surfaces formed of flexible thin films (foils) having low flexural rigidity and supports a load by allowing the bearing surfaces to be deflected. Normally, an inner circumferential surface of the bearing is formed of a thin plate called a top foil, and a spring-like member called a back foil is arranged on a radially outer side thereof. With this, a load on the top foil is elastically supported by the back foil. In this case, during rotation of the shaft, an air film is formed between an outer circumferential surface of the shaft and an inner circumferential surface of the top foil. With this, the shaft is supported in a non-contact manner.

The foils of the foil bearing are flexible, and hence appropriate radial bearing gaps are formed in accordance with operating conditions such as a rotation speed of a shaft, a load on the shaft, and an ambient temperature. Therefore, the foil bearing has a feature of excellent stability, and hence can be used at higher speed in comparison with general air dynamic pressure bearings. Further, radial bearing gaps in the general dynamic pressure bearings need to be managed on an order of one thousandth of the diameter of the shaft. For example, in a shaft having a diameter of approximately several millimeters, the radial bearing gaps of approximately several micrometers need to be constantly secured. Thus, in consideration of not only a manufacturing tolerance but also the thermal expansion in the drastic temperature changes, the gaps are difficult to strictly manage. Meanwhile, the foil bearing is advantageous in that radial bearing gaps only need to be managed to have a size of approximately several tens of micrometers, and hence the foil bearing can be easily manufactured and the bearing gaps can be easily managed.

As examples of such foil bearings, there have been publicly known a foil bearing in which the back foil includes cut-and-raised parts so as to elastically support the top foil (Patent Literature 1), a foil bearing in which a bearing foil is elastically supported by an elastic body formed of wires that are woven into a mesh form (Patent Literature 2), a foil bearing in which the back foil includes support portions that are held in contact with an inner surface of an outer race and are immovable in a circumferential direction, and elastic portions that are elastically deflected by contact pressure from the top foil (Patent Literature 3), and the like. Further, in each of Patent Literatures 4 and 5, there is disclosed what is called a multi-arc foil bearing in which a plurality of foils are arrayed in the circumferential direction, and both circumferential ends of each of the foils are mounted to the outer member.

CITATION LIST

Patent Literature 1: Japanese Patent Application Laid-open No. 2002-364643
Patent Literature 2: Japanese Patent Application Laid-open No. 2003-262222
Patent Literature 3: Japanese Patent Application Laid-open No. 2009-299748
Patent Literature 4: Japanese Patent Application Laid-open No. 2009-216239
Patent Literature 5: Japanese Patent Application Laid-open No. 2006-57828

SUMMARY OF INVENTION

Technical Problems

As described above, the related-art foil bearings each include the member for imparting elasticity to the top foil (such as the back foil and the elastic body). Thus, cost of manufacturing this member, and a large number of man-hours for assembly of this member to the outer member are required.

In view of the circumstances, it is a first object of the present invention to reduce the number of components of a foil bearing so as to reduce a manufacturing cost and assemblyman-hours.

Further, in the multi-arc foil bearings disclosed in Patent Literatures 4 and 5, radially inward projecting portions (displacement suppressing portions and engaging mechanisms) are formed at a plurality of positions spaced apart from each other in the circumferential direction on the inner circumferential surface of the outer member, and the foils are fixed circumferentially between those projecting portions. However, in this case, radially inner surfaces of the projecting portions are exposed circumferentially between the foils. Thus, areas of the bearing surfaces are reduced by an amount corresponding to areas of the projecting portions, and hence supportability may be reduced.

In view of the circumstances, it is a second object of the present invention to provide a multi-arc foil bearing comprising an outer member that allows foils to be mounted thereto without reducing areas of bearing surfaces.

Still further, in the foil bearings of Patent Literatures 4 and 5, both the circumferential ends of each of the foils are struck against the radially inward projecting portions on the inner circumferential surface of the outer member (displacement suppressing portions 62 in Patent Literature 4 and ridges 70 in Patent Literature 5). With this, both the circumferential ends of each of the foils are held by a foil holder.

It is a third object of the present invention to cause a multi-arc foil bearing to exert a greater effect of damping vibration of a shaft.

Solution to Problems

In order to achieve the above-mentioned first object, according to the first invention of the present application, there is provided a foil bearing, comprising: an outer member that has an inner circumferential surface having a cylindrical surface shape; and a plurality of foils that are mounted to the inner circumferential surface of the outer member and directly face the inner circumferential surface of the outer member in a radial direction without interposition of another member, the foil bearing being configured to radially support a shaft inserted on an inner circumference of the outer member in a freely relatively rotatable manner, wherein the plurality of foils each comprise: holding portions that are formed at both circumferential ends and held while in contact with the outer member; and a body portion that is formed circumferentially between the holding portions and has a bearing surface, and wherein at least an end portion on one side in a circumferential direction of the body portion of each of the plurality of foils is raised radially inward with respect to the inner circumferential surface of the outer member.

In this way, according to the foil bearing of the first invention of the present application, at least the end portion on the one side in the circumferential direction of the body portion of the each of the plurality of foils is not formed along the inner circumferential surface of the outer member, but is raised radially inward with respect to the inner circumferential surface of the outer member. With this, a radial gap is formed between the end portion of the body portion of the each of the plurality of foils and the inner circumferential surface of the outer member. Thus, when the shaft is relatively rotated to increase pressures in bearing gaps between an outer circumferential surface of the shaft and radially inner surfaces (bearing surfaces) of the plurality of foils, the plurality of foils are each elastically deformed in a direction in which the radial gap is narrowed. An elastic force is generated at this time, and thus resilience is imparted to the plurality of foils. Thus, without back foils or elastic bodies to be interposed between the plurality of foils and the outer member, required resilience can be imparted to the plurality of foils, and hence the back foils and the like can be omitted. As a result, the number of components of the foil bearing can be reduced.

In the foil bearing described above, for example, at least the holding portion on the one side in the circumferential direction of the each of the plurality of foils is inserted to a fixing groove formed in the inner circumferential surface of the outer member. With this, the holding portion can be held by the outer member. When this fixing groove is inclined radially outward to the one side in the circumferential direction, the end portion of the body portion of the each of the plurality of foils is raised from the inner circumferential surface of the outer member at an inclination angle of the fixing groove. Thus, a rising angle of the body portion of the each of the plurality of foils can be adjusted through adjustment of the inclination angle of the fixing groove.

Further, when the holding portion on the one side in the circumferential direction of the each of the plurality of foils comprises a projecting portion formed by extending an axial partial region of the body portion to the one side in the circumferential direction, and when the projecting portion is inserted to the fixing groove, an elastic force to be applied to the plurality of foils can be adjusted through adjustment of an axial width of the projecting portion. Further, when the holding portion comprises a plurality of the projecting portions formed apart from each other in an axial direction, the elastic force to be applied to the plurality of foils can be adjusted through adjustment of axial widths or the number of the plurality of projecting portions.

When at least one of the holding portions of the each of the plurality of foils is slidable against the outer member, frictional energy is generated by sliding between the plurality of foils and the outer member. With this, vibration to be caused by relative rotation of the shaft can be damped. In this case, through adjustment of frictional coefficients of sliding surfaces of the plurality of foils and the outer member, bearing characteristics can be adjusted. Specifically, when the frictional coefficients of the sliding surfaces are set to be high, the frictional energy to be generated by the sliding against the outer member is increased. Thus, a greater effect of damping the vibration to be caused during the relative rotation of the shaft can be obtained. As a result, stability of the bearing is enhanced. Meanwhile, when the frictional coefficients of the sliding surfaces are set to be low, under a state in which the shaft is held in contact with the plurality of foils, contact pressure therebetween facilitates sliding of the plurality of foils against the outer member. Thus, the plurality of foils are easily deformed in conformity with the outer circumferential surface of the shaft. In this way, contact areas between the shaft and the plurality of foils are increased. As a result, abrasion resistances thereof are enhanced.

In the foil bearing described above, through adjustment of the rising angle at the end portion of the body portion of the each of the plurality of foils, areas of the bearing surfaces that generate positive pressure in a fluid in radial bearing gaps R can be adjusted. For example, as illustrated in the developed view of FIG. 6, when a rising angle θ1 at an end portion on the one side in the circumferential direction of a body portion 13c of each foil 13 with respect to an inner circumferential surface 11a of an outer member 11 is set to be larger than a rising angle θ2 at an end portion on another side in the circumferential direction, a position at which a radial gap between a radially outer surface 13c1 of each of the foils 13 and the inner circumferential surface 11a of the outer member 11 is largest (hereinafter referred to as peak position P) is set on the one side in the circumferential direction (left side in FIG. 6) with respect to a circumferential central portion O of the body portion 13c of the each of the foils 13. In this state, when the shaft 6 is relatively rotated to the one side in the circumferential direction (direction of the arrow), a wedge-like radial bearing gap R to be gradually narrowed toward a forward side in a rotational direction is formed between a region on each of the foils 13 on the another side in the circumferential direction with respect to the peak position P and the outer circumferential surface 6a of the shaft 6, and this region functions as a bearing surface A that generates the positive pressure. In this way, when θ1>θ2 is established so that the peak position P is set rather on the one side in the circumferential direction, the bearing surface A is formed to be large. As a result, supportability can be enhanced. Note that, in this case, the rotational direction of the shaft 6 is limited to the one side in the circumferential direction (direction of the arrow in FIG. 6).

Meanwhile, as illustrated in the developed view of FIG. 8, when the rising angles θ1 and θ2 at both the ends of the body portion 13c of the each of the foils 13 are set to be equal to each other, the peak position P is set to the circumferential central portion O of the each of the foils 13. With this, the bearing surface A and a bearing surface A' can be formed to be equal to each other in area on both the sides in the circumferential direction with respect to the peak position P. Thus, the equivalent supportability can be exerted irrespective of the sides to which the shaft is rotated.

Further, in order to achieve the above-mentioned second object, according to the second invention of the present application, there is provided a foil bearing, comprising: an outer member that has an inner circumferential surface having a cylindrical surface shape; and a plurality of foils that are mounted to the inner circumferential surface of the outer member, the foil bearing being configured to radially support a shaft inserted on an inner circumference of the outer member in a freely relatively rotatable manner, wherein the plurality of foils each have a bearing surface, and comprise both circumferential end portions that are held while in contact with the outer member, wherein circumferential end portions of adjacent two of the plurality of foils are intersected with each other in an axial view, and wherein the circumferential end portions of the each of the plurality of foils are arranged on a radially outer side with respect to adjacent foils.

In this way, when the circumferential end portions of the adjacent two of the plurality of foils are intersected with each other in the axial view, and when the circumferential end portions of the each of the plurality of foils are arranged on the radially outer side with respect to the adjacent foils, the circumferential end portions of the each of the plurality of foils can be held by the inner circumferential surface of the outer member on a back side (radially outer side) of the plurality of foils. With this, the plurality of foils can be arranged continuously with each other in the circumferential direction, and the inner circumferential surface of the outer member can be covered overall with the plurality of foils. As a result, a decrease in area of the bearing surface can be avoided.

For example, when both the circumferential end portions of the each of the plurality of foils are inserted to fixing grooves formed in the inner circumferential surface of the outer member, the plurality of foils can be mounted to the outer member. Alternatively, also when the end portion on the one side in the circumferential direction of the each of the plurality of foils is inserted to the fixing groove formed in the inner circumferential surface of the outer member while the end portion on the another side in the circumferential direction of the each of the plurality of foils is arranged between the adjacent foil and the inner circumferential surface of the outer member, the plurality of foils can be mounted to the outer member.

When at least the end portion on the one side in the circumferential direction of the each of the plurality of foils is slidable against the outer member, frictional energy is generated by sliding between the plurality of foils and the outer member. With this, vibration to be cause by relative rotation of the shaft can be damped.

Specifically, when the end portion on the one side in the circumferential direction of the each of the plurality of foils comprises a projecting portion formed by extending an axial partial region, and when the end portion on the another side in the circumferential direction of the each of the plurality of foils comprises another projecting portion formed by extending another axial region different from that for the projecting portion, the projecting portion and the another projecting portion formed at the end portions of the adjacent foils can be intersected with each other in the axial view. Alternatively, also when the end portion on the one side in the circumferential direction of the each of the plurality of foils comprises the projecting portion formed by extending the axial partial region, and when the end portion on the another side in the circumferential direction of the each of the plurality of foils comprises a slit so that the projecting portion is inserted to the slit of the adjacent foil, the end portions of the adjacent foils can be intersected with each other in the axial view. In those cases, when the projecting portions are formed on the end portion on the one side in the circumferential direction of the each of the plurality of foils at a plurality of positions spaced apart from each other in an axial direction, and when those projecting portions are mounted to the outer member, the plurality of foils can be held with a good balance in the axial direction.

The foil bearing described above may comprise elastic members (such as back foils) for imparting radially inward elasticity to the plurality of foils, the elastic members being interposed between the plurality of foils and the inner circumferential surface of the outer member.

Further, in order to achieve the above-mentioned third object, according to the third invention of the present application, there is provided a foil bearing, comprising: an outer member that has an inner circumferential surface having a cylindrical surface shape; and a plurality of foils that are mounted to the inner circumferential surface of the outer member and directly face the inner circumferential surface of the outer member in a radial direction without interposition of another member, the foil bearing being configured to radially support a shaft inserted on an inner circumference of the outer member in a freely relatively rotatable manner, wherein the plurality of foils each comprise: holding portions that are formed at both circumferential ends and held while in contact with the outer member; and a body portion that is formed circumferentially between the holding portions and has a bearing surface, and wherein the holding portions are each held in a slidable state in a fixing groove formed in the inner circumferential surface of the outer member.

Advantageous Effects of Invention

As described above, according to the foil bearing of the first invention of the present application, the back foils or the elastic bodies for imparting the elasticity to the foils (top foils) having the bearing surfaces can be omitted. Thus, the number of components can be reduced, with the result that a manufacturing cost and assembly man-hours can be reduced.

Further, according to the second invention of the present application, it is possible to provide a multi-arc foil bearing comprising the outer member that allows the foils to be mounted thereto without reducing the areas of the bearing surfaces.

Still further, according to the foil bearing of the third invention of the present application, the holding portions of the foils and the fixing grooves are slid against each other. With this sliding of the foils, a greater effect of damping the vibration of the shaft can be exerted.

BRIEF DESCRIPTION OF DRAWINGS

FIG. 4 (*b*) is a perspective view of a state in which a plurality of the foils of FIG. 4(*a*) are combined with each other.

FIG. 7 (b) is a view of a state in which the shaft and the foil are held in contact with each other under a state in which the frictional coefficients of the sliding surfaces of the foil and the outer member are set to be low.

FIG. 15 (b) is a perspective view of a state in which a plurality of the back foils of FIG. 15(a) are combined with each other.

DESCRIPTION OF EMBODIMENTS

Now, description is made of embodiments of the present invention with reference to the drawings.

Figure 1:
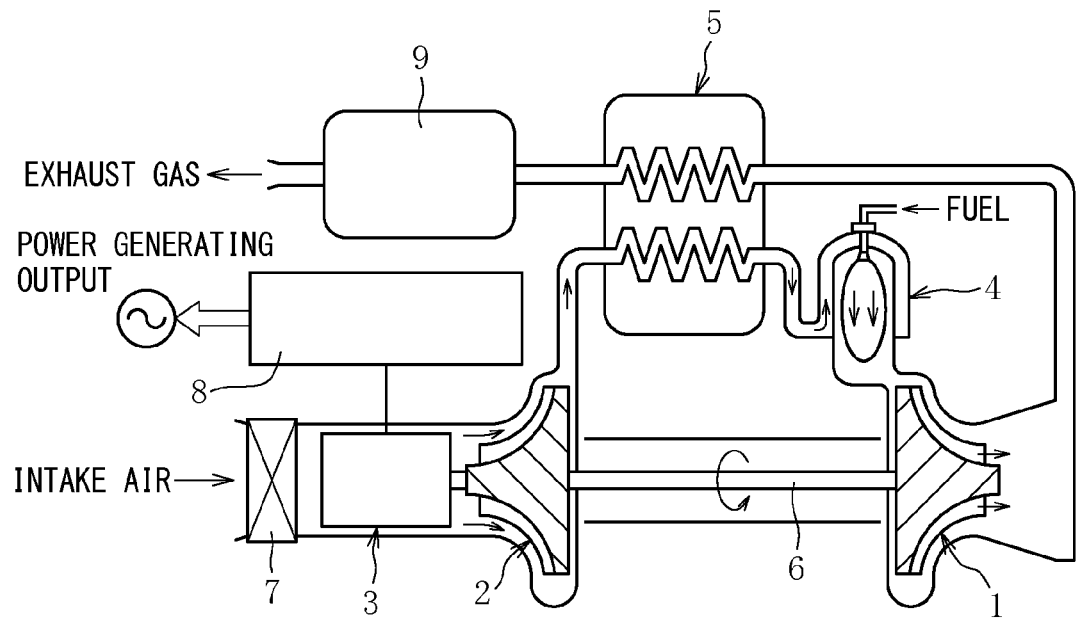
FIG. 1 is a schematic view of a configuration of a gas turbine.

FIG. 1 is a schematic view of a configuration of a gas turbine apparatus called a gas turbine. The gas turbine mainly comprises a turbine 1 comprising a blade cascade, a compressor 2, a power generator 3, a combustor 4, and a regenerator 5. The turbine 1, the compressor 2, and the power generator 3 comprise a common shaft 6 extending in a horizontal direction. The shaft 6, the turbine 1, and the compressor 2 serve as an integrally rotatable rotor. Air sucked from an air-intake port 7 is compressed by the compressor 2, heated by the regenerator 5, and then fed into the combustor 4. The compressed air is mixed with fuel and combusted so as to rotate the turbine 1 with a high-temperature and high-pressure gas. A rotational force of the turbine 1 is transmitted to the power generator 3 through intermediation of the shaft 6 so as to rotate the power generator 3. In this way, electric power is generated and output through intermediation of an inverter 8. The gas having rotated the turbine 1 has a relatively high temperature. Thus, the gas is fed into the regenerator 5 so that heat thereof is exchanged with that of the compressed air prior to the combustion. In this way, the heat of the gas after the combustion is reused. The gas that has been subjected to the heat exchange in the regenerator 5 passes through an exhaust heat recovery device 9, and then is exhausted as an exhaust gas.

Figure 2:
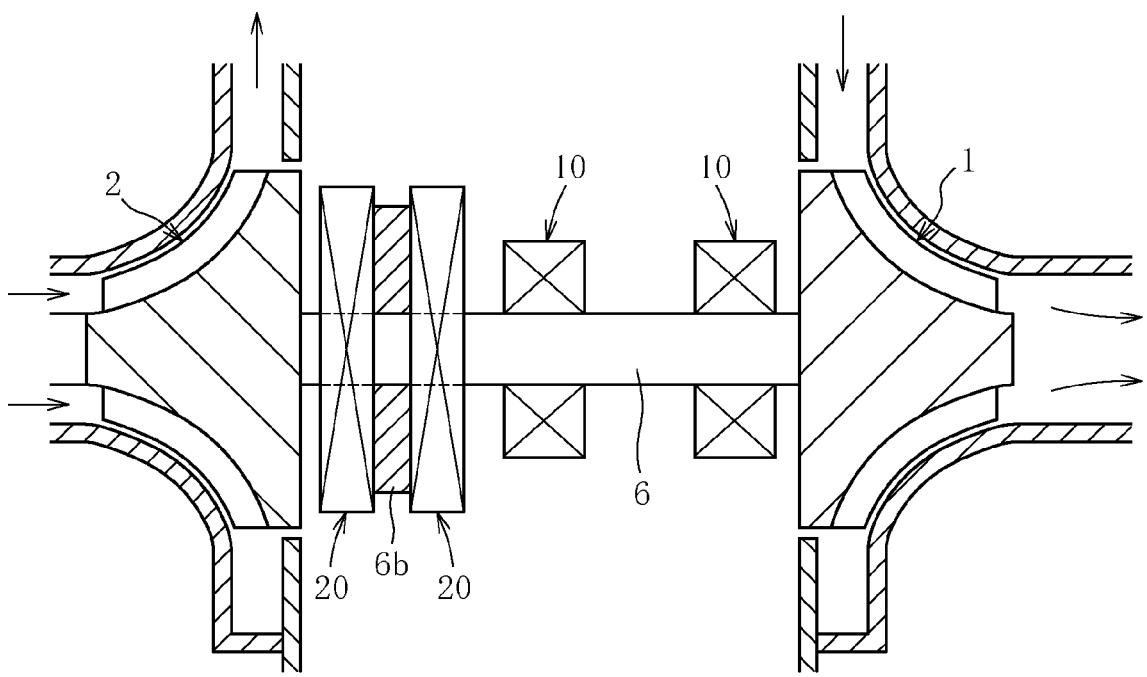
FIG. 2 is a sectional view of a support structure for a rotor of the gas turbine.

FIG. 2 is an illustration of an example of a support structure for the rotor of the gas turbine. This support structure comprises radial bearings 10 arranged at two positions in an axial direction, and thrust bearings 20 and 20 arranged on both sides in the axial direction of a flange portion 6b of the shaft 6. The radial bearings 10 and the thrust bearings 20 support the shaft 6 in a freely rotatable manner in a radial direction and both thrust directions.

In this support structure, a region between the turbine 1 and the compressor 2 is adjacent to the turbine 1 that is rotated by the high-temperature and high-pressure gas, and hence a temperature of an atmosphere therein is high. In this high-temperature atmosphere, a lubricant such as a lubricating oil and grease is deteriorated and evaporated. Thus, normal bearings (such as a rolling bearing) that use such lubricants are difficult to apply. Thus, air dynamic pressure bearings, in particular, foil bearings are suited to the bearings 10 and 20 that are used in the support structure of this type.

Now, description is made of the configuration of the foil bearing 10 that is suited to the radial bearings for the gas turbine with reference to the drawings.

Figure 3:
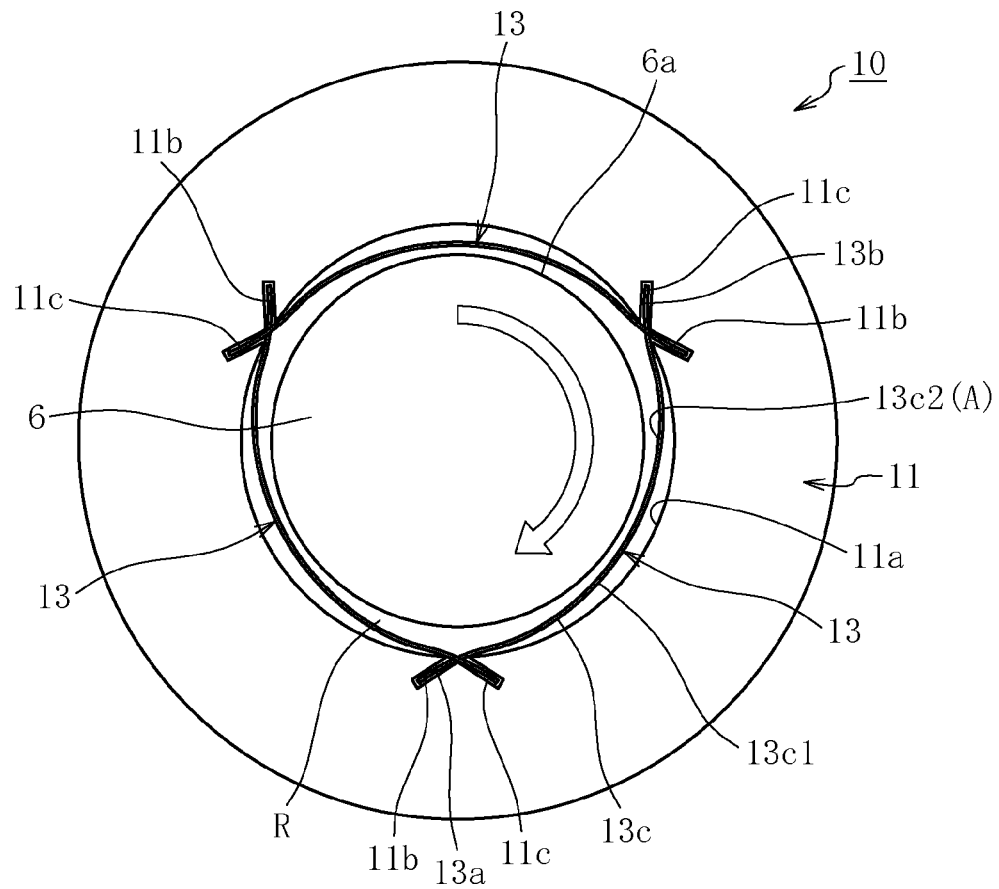
FIG. 3 is an axial front view of a foil bearing according to an embodiment of the present invention.

As illustrated in FIG. 3, this foil bearing 10 comprises an outer member 11 that is fixed to an inner circumference of a housing (not shown) and has an inner circumference on which the shaft 6 is inserted, and a plurality of foils 13 mounted to an inner circumferential surface 11a of the outer member 11. The foil bearing 10 is a foil bearing of what is called a multi-arc type in which the inner circumferential surface 11a of the outer member 11 is formed into a cylindrical surface shape, and three foils 13 are arrayed in a circumferential direction on the inner circumferential surface 11a. Between the inner circumferential surface 11a of the outer member 11 and the foils 13, members for imparting elasticity to the foils 13 (such as back foils) are not interposed, and a radially outer surface 13c1 of each of the foils 13 and the inner circumferential surface 11a of the outer member 11 directly face each other in a radial direction.

The foils 13 each comprise holding portions 13a and 13b formed at both circumferential ends thereof, and a body portion 13c formed circumferentially between both the holding portions 13a and 13b. The foils 13 are each formed to integrally comprise the holding portions 13a and 13b and the body portion 13c through, for example, press working of a single foil. The holding portions 13a and 13b are held while in contact with the outer member 11. The holding portions 13a and 13b of adjacent foils 13 are formed to intersect with each other in an axial view (refer to FIG. 3). The holding portions 13a and 13b of each of the foils 13 are arranged on a radially outer side with respect to the body portions 13c of the adjacent foils 13. In the illustrated example, the holding portions 13a and 13b are inserted to fixing grooves 11b and 11c formed in the inner circumferential surface 11a of the outer member 11. The fixing grooves 11b and 11c are formed, for example, by a wire cutting process over an entire axial length of the outer member 11. At least one of the holding portions 13a and 13b is not perfectly fixed to corresponding one of the fixing grooves 11b and 11c, and held in a slidable state. The fixing groove 11b is inclined radially outward to one side in the circumferential direction (forward side in a rotational direction of the shaft 6, refer to the arrow in FIG. 3), and the fixing groove 11c is inclined radially outward to another side in the circumferential direction. The fixing grooves 11b and 11c are opened at the same position in the circumferential direction. The body portion 13c of each of the foils 13 is formed by curving a rectangular flat plate into a substantially circular-arc shape, and has a radially inner surface 13c2 as a bearing surface A.

Figure 4A:
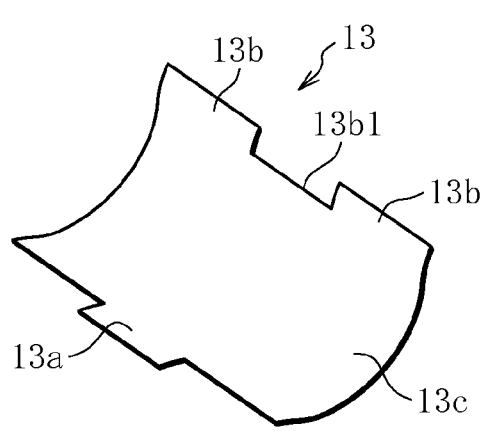
FIG. 4 (*a*) is a perspective view of a foil that is used in the foil bearing.

As illustrated in FIG. 4(a), the holding portion 13a on the one side in the circumferential direction of each of the foils 13 comprises a projecting portion formed by extending an axial partial region of the body portion 13c (axial central portion in the illustrated example) to the one side in the circumferential direction. Meanwhile, the holding portions 13b on the another side in the circumferential direction of each of the foils 13 each comprise a projecting portion formed by extending another axial part of the body portion 13c to the another side in the circumferential direction. The holding portions 13b on the another side in the circumferential direction comprise a plurality of (two in the illustrated example) projecting portions formed apart from each other in the axial direction, and a recessed portion 13b1 is formed axially therebetween. The holding portion 13a formed at one end of the foil 13 is inserted to the recessed portion 13b1 between the holding portions 13b formed at another end of the adjacent foil. With this, the holding portions 13a and 13b intersect with each other in the axial view (refer to FIG. 4 (b)).

Figure 4B:
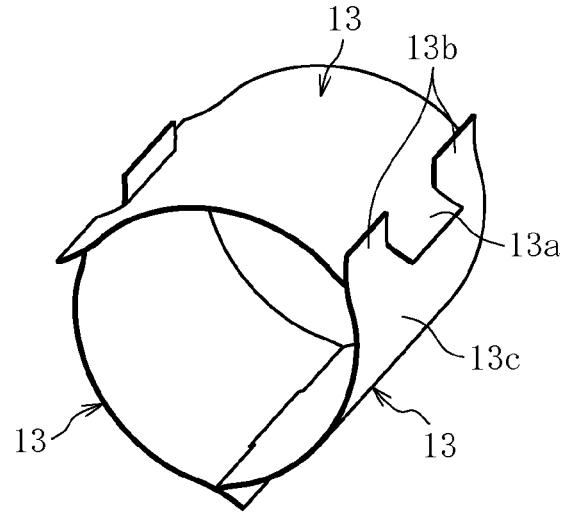

As illustrated in FIG. 4(b), the holding portion 13a on the one side of each of the foils 13 is inserted to the recessed portion 13b1 formed axially between the holding portions 13b on the another side of the adjacent foil 13 so that the plurality of (three in the illustrated example) foils 13 are integrated with each other. In this state, the holding portions 13a and 13b are inserted respectively to the fixing grooves 11b and 11c. With this, the plurality of foils 13 are mounted to the inner circumferential surface 11a of the outer member 11. In this way, when the holding portions 13a and 13b of adjacent foils 13 are intersected with each other and inserted to the fixing grooves 11b and 11c on the radially outer side (back side) of the foils 13, an entire circumference of the inner circumferential surface 11a of the outer member 11 can be covered with the body portions 13c of the foils 13. Thus, areas of the bearing surfaces can be maximally secured. Further, circumferential end portions of each of the foils 13 (holding portions 13a and 13b) are not exposed to sliding surfaces of the foils 13 and the shaft 6. Thus, a risk that the circumferential end portions of each of the foils 13 are curled up radially inward can be reliably prevented.

Figure 5:
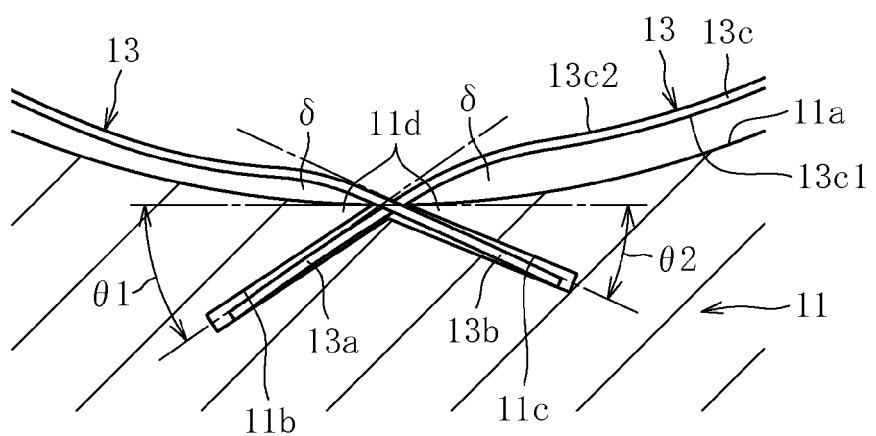
FIG. 5 is an enlarged sectional view of the foil bearing.

As illustrated in FIG. 5, both circumferential ends of the body portions 13c of the foils 13 (boundary portion between the holding portions 13a and 13b) do not extend along the inner circumferential surface 11a of the outer member 11, but are raised radially inward toward circumferential centers of the body portions 13c with respect to the inner circumferential surface 11a. In the illustrated example, boundary portions between both the circumferential ends of the body portion 13c and the holding portions 13a and 13b are smoothly continued without being bent, and the circumferential end portions of the body portion 13c are each curved to form a radially inward convex. With this, at both the circumferential ends of the body portions 13c of the foils 13, radial gaps δ are formed between the radially outer surfaces 13c1 of the foils 13 and the inner circumferential surface 11a of the outer member 11. The foils 13 are elastically deformable in a direction in which the radial gaps δ are narrowed. Specifically, the foils 13 are designed to be deformed only elastically (not to be plastically deformed) at the time when the radial gaps δ are narrowed by the foils 13 that are pressed radially outward by an increase in pressure in a radial bearing gap R between an outer circumferential surface 6a of the shaft 6 and the bearing surface A of each of the foils 13 along with rotation of the shaft 6. When vicinities of end portions of the body portions 13c of the foils 13 are elastically deformed in this way, a radially inward elastic force is applied to the foils 13. The elastic force to be applied to the foils 13 can be adjusted through adjustment of axial dimensions, the number, and arrangement positions of the holding portions 13a and 13b, or as described below, rising angles $\theta_1$ and $\theta_2$ at both the ends of the body portions 13c.

Figure 6:
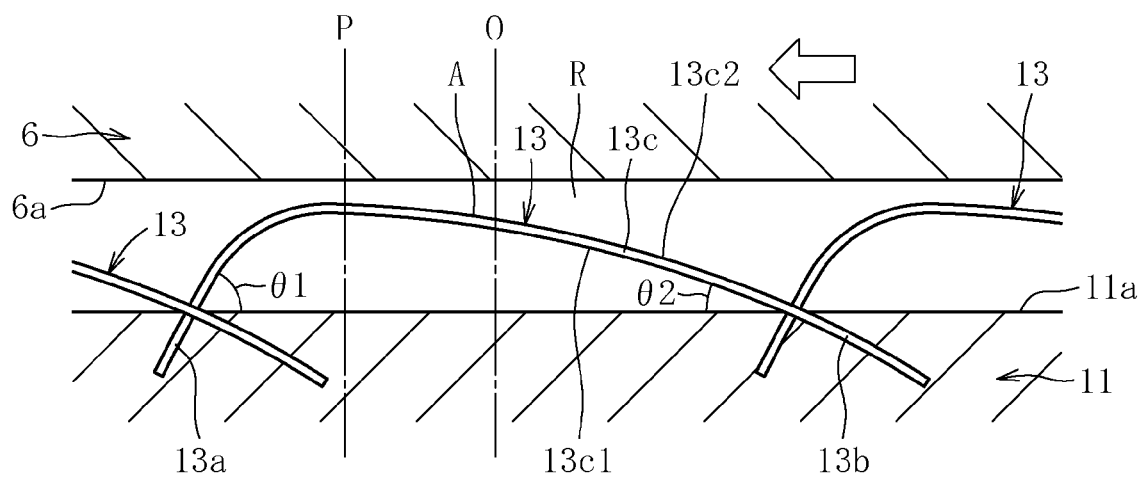
FIG. 6 is a developed view of the foil bearing in which a circumferential direction is converted into a straight direction.

In this embodiment, the rising angles at both the ends of the body portion 13c of each of the foils 13 with respect to the inner circumferential surface 11a of the outer member 11 are different from each other. The rising angle at the end portion of the body portion 13c refers to an angle between a tangent at the end portion of the body portion 13c and a tangent at a position on the inner circumferential surface 11a of the outer member 11, at which the inner circumferential surface 11a of the outer member 11 intersects with the foil 13 (that is, opening portion of the fixing groove 11b). In this embodiment, as illustrated in FIG. 5, the rising angle $\theta_1$ at one end of the body portion 13c (holding portion 13a side) is set to be higher than the rising angle $\theta_2$ at another end thereof (holding portions 13b side). In this way, when the rising angles at both the ends of the body portions 13c satisfy $\theta_1 > \theta_2$, as illustrated in the developed view of FIG. 6, a peak position (radially innermost swelling position) P of each of the foils 13 is set on the one end side (holding portion 13a side) with respect to a circumferential central portion O of the body portion 13c of the foil 13. When the shaft 6 is rotated to the one side in the circumferential direction (refer to the arrow in FIG. 6), the radial bearing gap R to be gradually narrowed toward the forward side in the rotational direction is formed between the outer circumferential surface 6a of the shaft 6 and the bearing surface A of the foil 13. At this time, as described above, the peak positions P of the foils 13 are set rather on the one side, and hence the bearing surfaces A that generate positive pressure are each formed over a large region on the another end side with respect to the peak position P. Thus, the radial bearing gap R can be secured in a large region in the circumferential direction. As a result, supportability in the radial direction is enhanced. Note that, in this embodiment, the connecting portions between the body portion 13c and the holding portions 13a and 13b of the foil 13 are smoothly continued. Thus, the rising angles $\theta_1$ and $\theta_2$ of the body portion 13c are substantially equal to inclination angles of the fixing grooves 11b and 11c.

When the rising angles $\theta_1$ and $\theta_2$ of the body portion 13c of each of the foils 13 are excessively high, the foils 13 largely swell radially inward. As a result, there arises a high risk that the foils 13 are bent by interference with the shaft 6. Thus, it is desired that the rising angles $\theta_1$ and $\theta_2$ each be set to 30° or less, preferably, to 20° or less.

The foil 13 is formed of a belt-like foil made of a metal that is excellent in resiliency and processability, such as a steel material or a copper alloy, and having a thickness of from approximately 20 μm to 200 μm. As in this embodiment, in the air dynamic pressure bearing that uses air as a fluid film, a lubricating oil does not exist in an atmosphere, and hence a rust inhibiting effect by an oil cannot be expected. Carbon steel and brass can be taken as typical examples of the steel material and the copper alloy. However, general carbon steel is liable to corrode due to rust, and brass may be subjected to delayed cracking due to processing strain (this liability becomes higher in proportion to a Zn content in brass). Thus, it is preferred that the belt-like foil be made of stainless steel or bronze.

In the configuration described above, when the shaft 6 is rotated to the one side in the circumferential direction (direction of the arrow in FIG. 3), that is, in a shrinkage direction of the wedge-like radial bearing gap R, air films are formed between the bearing surfaces A of the foils 13 and the outer circumferential surface 6a of the shaft 6. When pressures of those air films become higher, the end portions of the body portions 13c of the foils 13 are pressed radially outward and elastically deformed in the direction in which the radial gaps δ are narrowed. When the body portions 13c are pressed radially outward in this way, a moment force is applied to boundary portions between the body portions 13c and the holding portions 13a and 13b. At this time, the holding portions 13a and 13b are inserted to the fixing grooves 11b and 11c, and hence both surfaces of each of the holding portions 13a and 13b are held by inner walls of the fixing grooves 11b and 11c. With this, angles of the holding portions 13a and 13b are maintained, and hence the rising angles at both the circumferential end portions of the body portion 13c continuous therewith are also maintained. In this state, when the end portions of the body portion 13c are curved, elastic forces can be effectively exerted.

Then, wedge-like radial bearing gaps R are formed at a plurality of positions (three positions in the illustrated example) in the circumferential direction around the shaft 6, and the shaft 6 is supported in a freely rotatable manner in the radial direction under a non-contact state with respect to the foils 13. In this state, shapes of the foils 13 are maintained at positions at which the elastic forces of the foils 13 and the pressures of the air films to be formed in the radial bearing gaps R are counterbalanced. Note that, widths of the radial bearing gaps R, which are actually as fine as approximately several tens of micrometers, are illustrated on an exaggerated scale in FIG. 3 and FIG. 6. Further, the foils 13 are flexible, and hence the bearing surfaces A of the foils 13 are arbitrarily deformed in accordance with operating conditions such as a load, a rotation speed of the shaft 6, and an ambient temperature. Thus, the radial bearing gaps R are automatically adjusted to have appropriate widths in accordance with the operating conditions. As a result, even under severe conditions involving high temperature and high speed rotation, the radial bearing gaps R can be managed to have optimum widths, and hence the shaft 6 can be stably supported.

In the foil bearing 10, air films formed during low speed rotation immediately before stop of the shaft 6 or immediately after actuation of the shaft 6 are difficult to have a thickness equal to or larger than surface roughnesses around the bearing surfaces A of the foils 13 and the outer circumferential surface 6a of the shaft 6. Thus, metal contact occurs between the bearing surfaces A of the foils 13 and the outer circumferential surface 6a of the shaft 6, which causes an increase in torque. In order to reduce a frictional force generated at this time so that the torque is reduced, it is desired that coating (first coating) for reducing surface friction be formed on any one or both of the bearing surface A (radially inner surface 13c2) of each of the foils 13 and a surface of a member that slides against the bearing surface A (in this embodiment, the outer circumferential surface 6a of the shaft 6). As the coating, there may be used, for example, a DLC film, a titanium aluminum nitride film, or a molybdenum disulfide film. The DLC film and the titanium aluminum nitride film can be formed through CVD or PVD, and the molybdenum disulfide film can be easily formed through spraying. In particular, the DLC film and the titanium aluminum nitride film are hard. Thus, when the coating is formed of those films, abrasion resistance of the bearing surfaces A can also be enhanced. As a result, a bearing life can be prolonged.

Further, during operation of the bearing, due to influence of the air films formed in the radial bearing gaps, the foil 13 is radially expanded overall to press the inner circumferential surface 11a of the outer member 11. In accordance therewith, slight circumferential sliding occurs between the radially outer surface 13c1 of each of the foils 13 and the inner circumferential surface 11a of the outer member 11 and between the holding portions 13a and 13b of the foils 13 and the fixing grooves 11b and 11c. As a countermeasure, coating (second coating) is formed on any one or both of the radially outer surface 13c1 of each of the foils 13 and the inner circumferential surface 11a of the outer member 11, which is held in contact with the radially outer surface 13c1, or on any one or both of the holding portions 13a and 13b of the foils 13 and the fixing grooves 11b and 11c, which are held in contact with the holding portions 13a and 13b. With this, abrasion resistances at those sliding portions can be enhanced. Note that, in the foil bearing 10 described above, both the circumferential ends of the body portion 13c of each of the foils 13 are raised radially inward with respect to the inner circumferential surface 11a of the outer member 11. Thus, the radially outer surface 13c1 of the body portion 13c and the inner circumferential surface 11a of the outer member 11 are scarcely held in contact with each other. Thus, it is effective to form the above-mentioned second coating on the holding portions 13a and 13b of each of the foils 13 and on the fixing grooves 11b and 11c to be held in contact therewith.

Further, through adjustment of frictional coefficients of sliding surfaces of the foils 13 and the outer member 11, bearing characteristics can be adjusted. Specifically, when a frictional coefficient of at least one of the sliding surface of each of the foils 13 or the sliding surface of the outer member 11 (for example, front surfaces of the holding portions 13a and 13b of each of the foils 13) is set to be high, frictional energy to be generated by sliding against the outer member 11 (for example, inner surfaces of the fixing grooves 11b and 11c) is increased. Thus, a greater effect of damping vibration to be caused by the rotation of the shaft 6 can be obtained. In this case, it is preferred that the DLC film and the titanium aluminum nitride film, which are larger in friction coefficient but higher in abrasion resistance than the molybdenum disulfide film, be used as the second coating. Specifically, the molybdenum disulfide film is used as the first coating to be formed on the bearing surfaces A, and the titanium aluminum nitride, the DLC film, or the like is used as the second coating to be formed on the sliding portion between the foil 13 and the outer member 11. With this, frictional coefficients of both the coatings can be set to be different from each other. As a result, lower torque and higher vibration damping property can be simultaneously obtained.

Figure 7A:
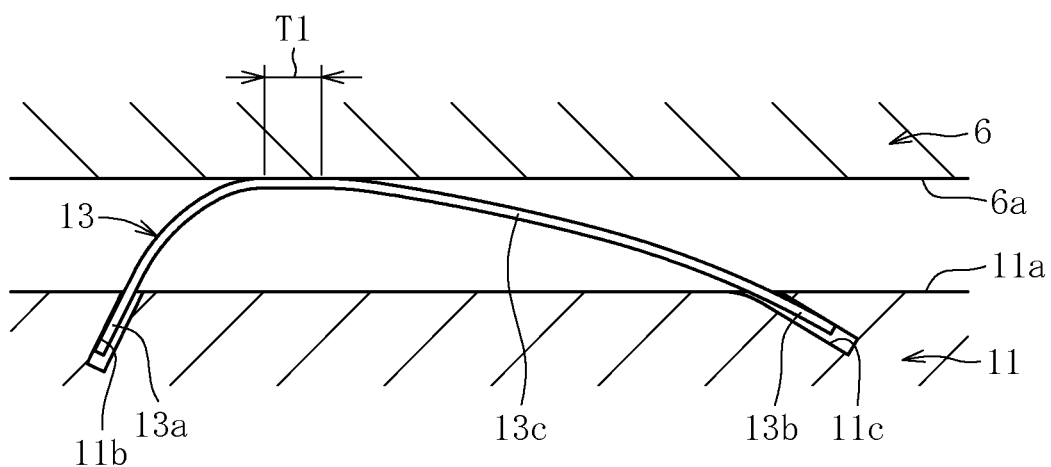
FIG. 7 (a) is a view of a state in which a shaft and the foil are held in contact with each other under a state in which frictional coefficients of sliding surfaces of the foil and an outer member are set to be high.
Figure 7B:
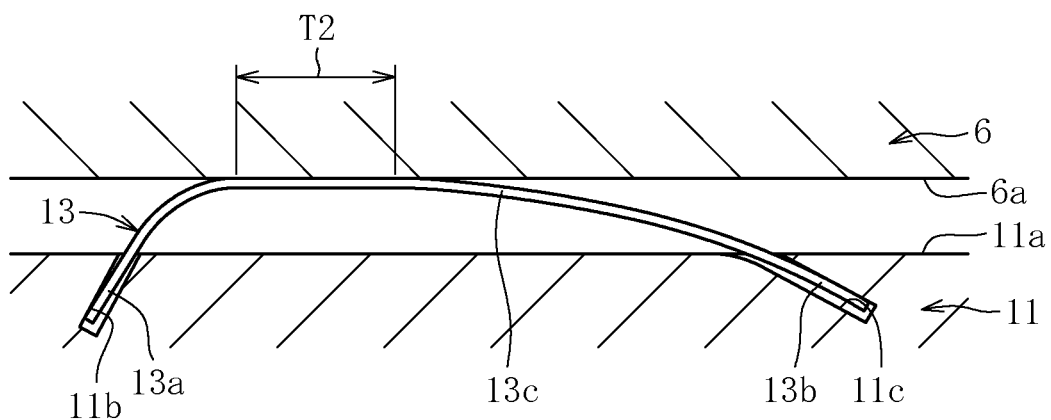

Meanwhile, when the frictional coefficient of at least one of the sliding surface of each of the foils 13 or the sliding surface of the outer member 11 (for example, front surfaces of the holding portions 13a and 13b of each of the foils 13) is set to be low, abrasion resistance of the foils 13 at the time of contact sliding against the shaft 6 can be enhanced. Specifically, when the shaft 6 and the foils 13 come into contact with each other during low speed rotation immediately after actuation of the shaft 6 or immediately before stop of the rotation of the shaft 6, contact pressure therebetween causes the holding portions 13a and 13b of the foils 13 to slide against the fixing grooves 11b and 11c of the outer member 11, and to cause the foils 13 to be deformed in conformity with the outer circumferential surface 6a of the shaft 6. At this time, when the frictional coefficients of the sliding surfaces of each of the foils 13 and the outer member 11 are set to be high, as illustrated in FIG. 7(a), the holding portions 13a and 13b of the foil 13 are difficult to slide against the fixing grooves 11b and 11c. Thus, the foil 13 is difficult to conform to the outer circumferential surface 6a of the shaft 6. In this case, a contact region T1 between the foil 13 and the outer circumferential surface 6a of the shaft 6 is small, and hence contact pressure per unit area becomes higher. As a result, the foil 13 and the shaft 6 are liable to be abraded. Meanwhile, when the frictional coefficients of the sliding surfaces of each of the foils 13 and the outer member 11 are set to be low, as illustrated in FIG. 7(b), the holding portions 13a and 13b of the foil 13 are easy to slide against the fixing grooves 11b and 11c. Thus, the foil 13 is easy to conform to the outer circumferential surface 6a of the shaft 6. In this case, a contact region T2 between the foil 13 and the outer circumferential surface 6a of the shaft 6 is large, and hence contact pressure per unit area becomes lower. As a result, the foil 13 and the shaft 6 are less liable to be abraded.

Figure 8:
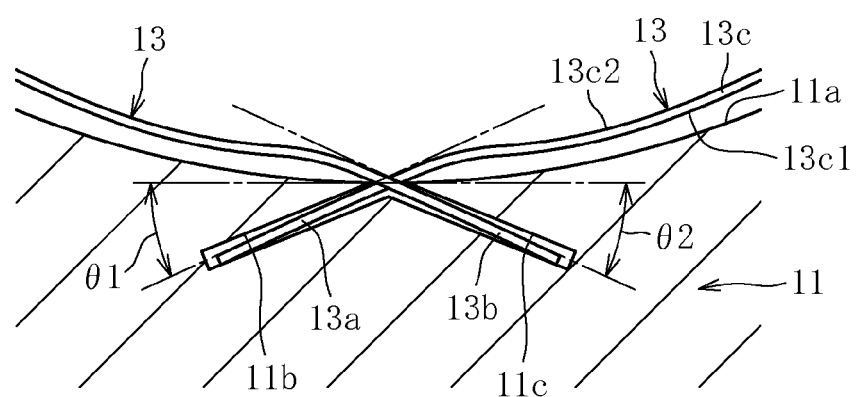
FIG. 8 is an enlarged sectional view of a foil bearing according to another embodiment of the present invention.
Figure 9:
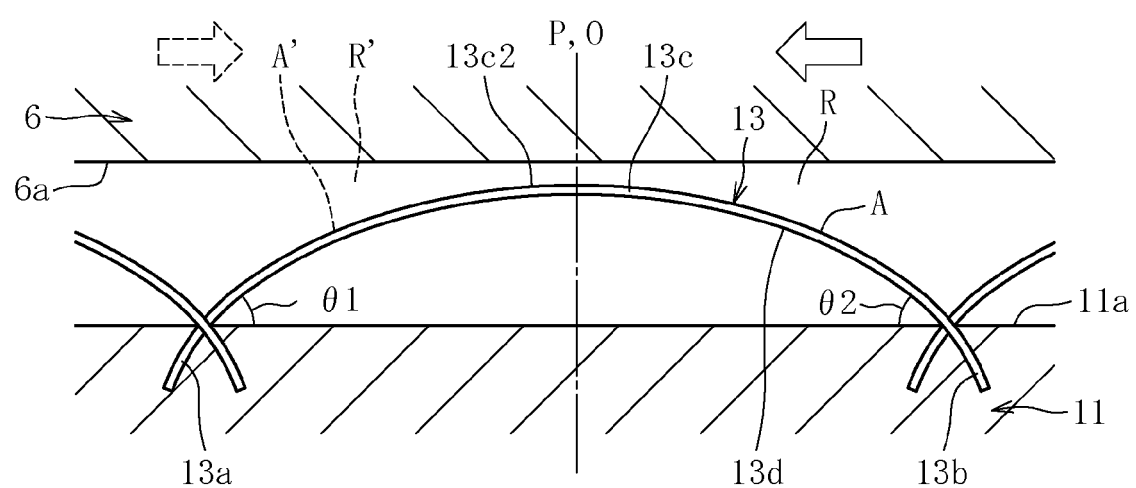
FIG. 9 is a developed view of the foil bearing of FIG. 8 in which the circumferential direction is converted into the straight direction.

The present invention is not limited to the embodiment described above. In the case of the embodiment described above, the rising angles θ1 and θ2 at both the ends of the body portion 13c of each of the foils 13 are set to be different from each other. However, as illustrated, for example, in FIG. 8, the rising angles θ1 and θ2 may be set to be equal to each other (θ1=θ2). In this case, as illustrated in FIG. 9, the peak position P is set to the circumferential central portion O of each of the foils 13. In this state, the shape of each of the foils 13 is symmetrical in the circumferential direction with respect to the peak position P, and the bearing surface A and a bearing surface A' are formed to be equal to each other in area on both circumferential sides with respect to the peak position P. With this, when the shaft 6 is rotated to the one side (refer to the solid-line arrow in FIG. 9), the radial bearing gap R to be gradually narrowed toward the forward side in the rotational direction is formed between the bearing surface A formed on the another side in the circumferential direction with respect to the peak position P and the outer circumferential surface 6a of the shaft 6. Meanwhile, when the shaft 6 is rotated to the another side (refer to the dotted-line arrow in FIG. 9), a radial bearing gap R' to be gradually narrowed toward the forward side in the rotational direction is formed between the bearing surface A' formed on the one side in the circumferential direction with respect to the peak position P and the outer circumferential surface 6a of the shaft 6. In this way, when the rising angles θ1 and θ2 are set to be equal to each other, the same supportability can be exerted irrespective of the sides to which the shaft 6 is rotated.

Figure 10A:
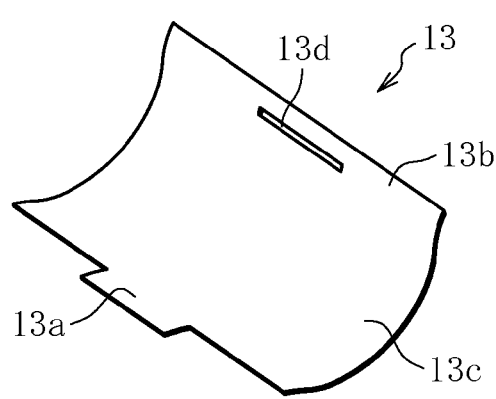
FIG. 10(a) is a perspective view of a foil that is used in a foil bearing according to still another embodiment of the present invention.
Figure 10B:
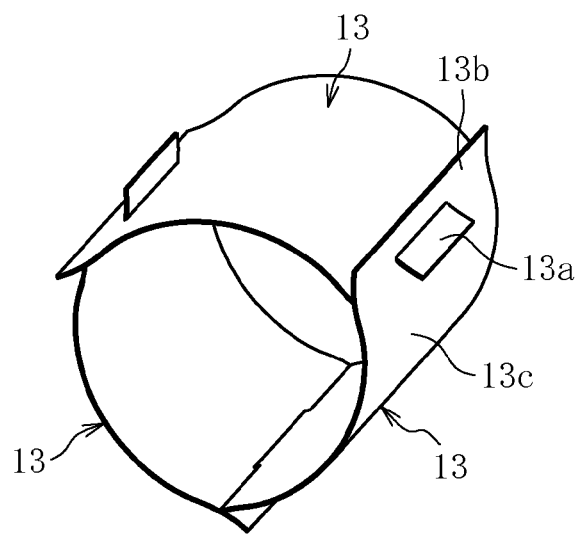
FIG. 10 (b) is a perspective view of a state in which a plurality of the foils of FIG. 10(a) are combined with each other.

The embodiment illustrated in FIG. 10 is different from the embodiment described above in that a slit 13d is formed in the boundary between the body portion 13c and the holding portions 13b on the another end side of the foil 13. The slit 13d is formed at the same axial position as that of the holding portion 13a on the one end side of the foil 13, and is capable of allowing the holding portion 13a to be inserted thereto (refer to FIG. 10 (b)). The holding portion 13a is inserted to the slit 13d of the adjacent foil 13 so that the plurality of foils 13 are coupled to each other to form a ring. In this state, the holding portions 13a and 13b of each of the foils 13 are inserted to the fixing grooves 11b and 11c of the outer member 11. With this, the foils 13 are mounted to the inner circumferential surface 11a of the outer member 11. An axial view of the foil bearing 10 is the same as that in FIG. 3. In this case, the holding portion 13a of each of the foils 13 is inserted to the fixing groove 11b through the slit 13d of the adjacent foil 13, and hence the holding portion 13a and the slit 13d are engaged with each other in the circumferential direction. With this, movement in the circumferential direction of the another end (holding portion 13b) of each of the foils 13 can be reliably restricted.

Figure 11:
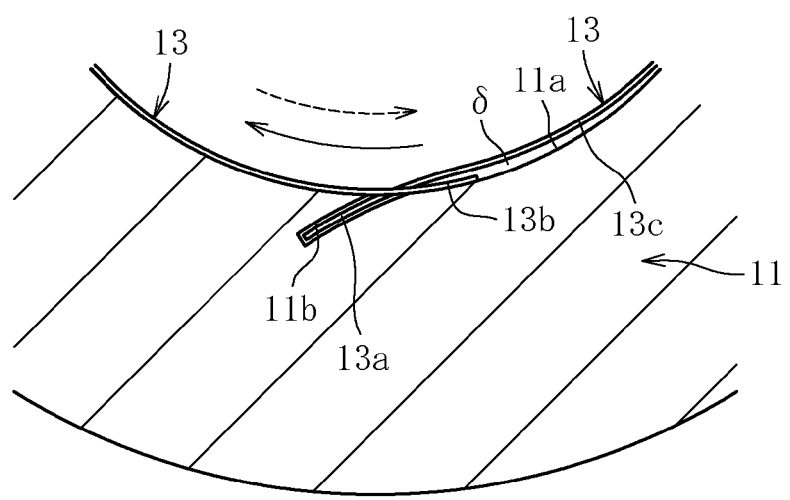
FIG. 11 is an enlarged sectional view of the foil bearing according to yet another embodiment of the present invention.

The embodiment illustrated in FIG. 11 is different from the embodiments described above in that the fixing groove 11c is not formed in the outer member 11, and the holding portion 13b on the another end side of the foil 13 is formed along the inner circumferential surface 11a of the outer member 11. Specifically, the holding portions 13a and 13b of adjacent foils 13 are intersected with each other in the axial view (refer to FIG. 4 (b) or 10 (b)). In this state, the holding portion 13a on the one end side is inserted to the fixing groove 11b of the outer member 11, and the holding portion 13b on the another end side of each of the foils 13 is inserted to a space between the adjacent foil 13 and the inner circumferential surface 11a of the outer member 11. With this, the holding portion 13b on the another end side of each of the foils 13 is pressed from a radially inner side by the adjacent foil 13, and held while in contact with the inner circumferential surface 11a of the outer member 11. Note that, also in this case, as in the embodiment described above, through adjustment of the frictional coefficients of the sliding surfaces of the holding portions 13b of the foils 13 and the inner circumferential surface 11a of the outer member 11, bearing characteristics can be adjusted (refer to FIG. 7).

Figure 12:
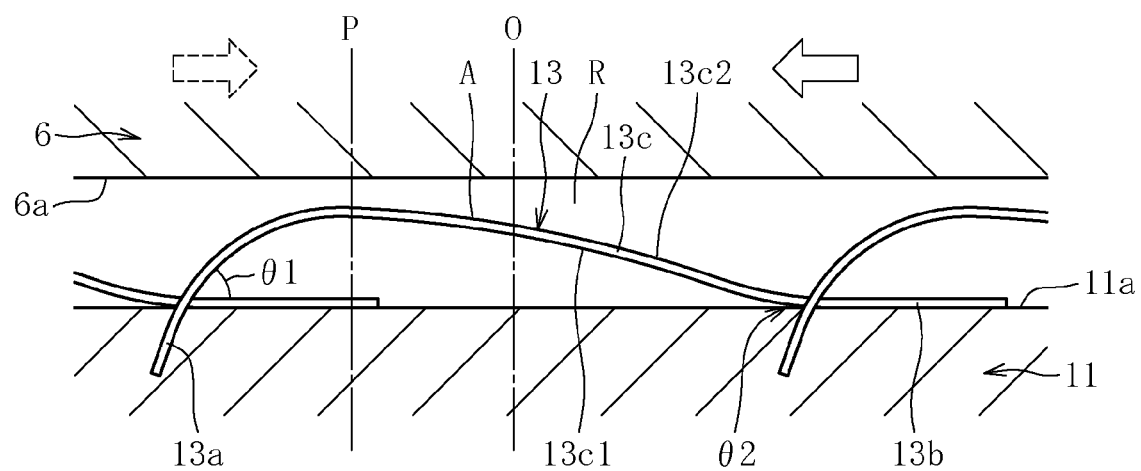
FIG. 12 is a developed view of the foil bearing of FIG. 11 in which the circumferential direction is converted into the straight direction.

In this case, movement of the foils 13 to the one side in the circumferential direction (direction of the solid-line arrow in FIG. 11) is restricted when the holding portion 13a strikes against a depth portion of the fixing groove 11b or when the slit strikes against the holding portion 13a. Meanwhile, the foils 13 are movable to the another side in the circumferential direction (direction of the dotted-line arrow in FIG. 11). Thus, when the shaft 6 is rotated to the another side in the circumferential direction (direction of the dotted-line arrow in FIG. 11), the foils 13 slide against the shaft 6 and are moved to the another side in the circumferential direction. As a result, the holding portion 13a on the one end side of each of the foils 13 may be disengaged from the fixing groove 11b. Further, in this foil bearing 10, the holding portion 13b on the another end side of each of the foils 13 is formed along the inner circumferential surface 11a of the outer member 11. Thus, as illustrated in FIG. 12, the rising angle θ2 on the another end side of the body portion 13c is substantially zero. As a result, the peak position P of the foil 13 is set rather on the one end side with respect to the circumferential central portion O of the body portion 13c (left side in FIG. 12). Thus, when the shaft 6 is rotated to the one side in the circumferential direction (direction of the solid-line arrow), on the radially outer surface 13c1 of the body portion 13c, the large region on the another end side with respect to the peak position P (right side in FIG. 12) functions as the bearing surface A. In view of this, this foil bearing 10 is used for supporting the shaft 6 that is relatively rotated only to the one side in the circumferential direction (direction of the solid-line arrow).

Figure 13A:
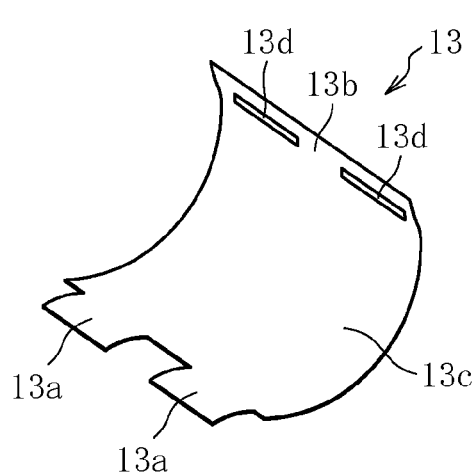
FIG. 13(a) is a perspective view of a foil that is used in a foil bearing according to yet another embodiment of the present invention.
Figure 13B:
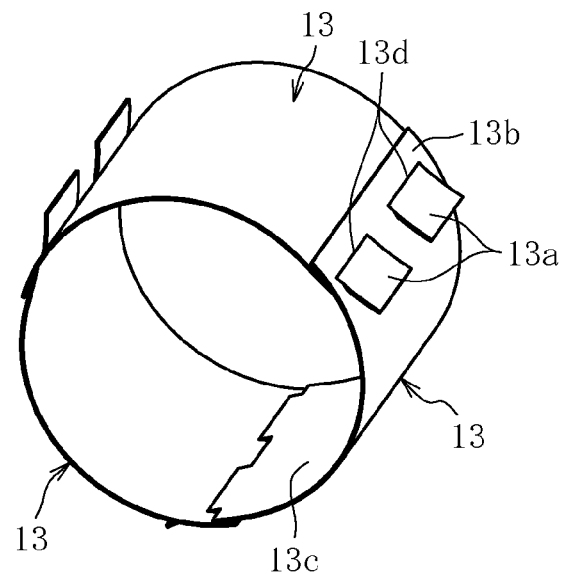
FIG. 13 (b) is a perspective view of a state in which a plurality of the foils of FIG. 13(a) are combined with each other.

The embodiment illustrated in FIG. 13 is different from the embodiments described above in that the holding portion 13a on the one side in the circumferential direction of the foil 13 comprises a plurality of projecting portions spaced apart from each other in the axial direction. When the plurality of projecting portions (holding portions 13a) spaced apart from each other in the axial direction in this way are inserted to the fixing groove 11b of the outer member 11, the end portions of the foil 13 are held at two positions spaced apart from each other in the axial direction in the fixing groove 11b. Thus, the foil 13 can be held with a good balance in the axial direction. In this embodiment, as in the embodiment illustrated in FIG.

10, the slits 13d are formed at the another end of the foil 13 so that the holding portions 13a are inserted to those slits 13d. However, the present invention is not limited thereto, and although not shown, as in the embodiment illustrated in FIG. 4, the holding portions 13b at the another end of the foil 13 may comprise a plurality of projecting portions extended from the body portion 13c so that the holding portions 13a on the one side are inserted to a recessed portion between those holding portions 13b. Further, the foils 13 may be fixed to the outer member 11 by inserting, as illustrated in FIG. 3, both the holding portions 13a and 13b to the fixing grooves 11b and 11c, or by inserting, as illustrated in FIG. 11, only the holding portions 13a on the one side to the fixing groove 11b while forming the holding portions 13b on the another side along the inner circumferential surface 11a of the outer member 11. Still further, in FIG. 13, two projecting portions are formed as the holding portions 13a. However, the present invention is not limited thereto, and three or more projecting portions may be formed as the holding portions 13a. In this case, the slits 13d are formed as many as the projecting portions as the holding portions 13a.

Figure 14:
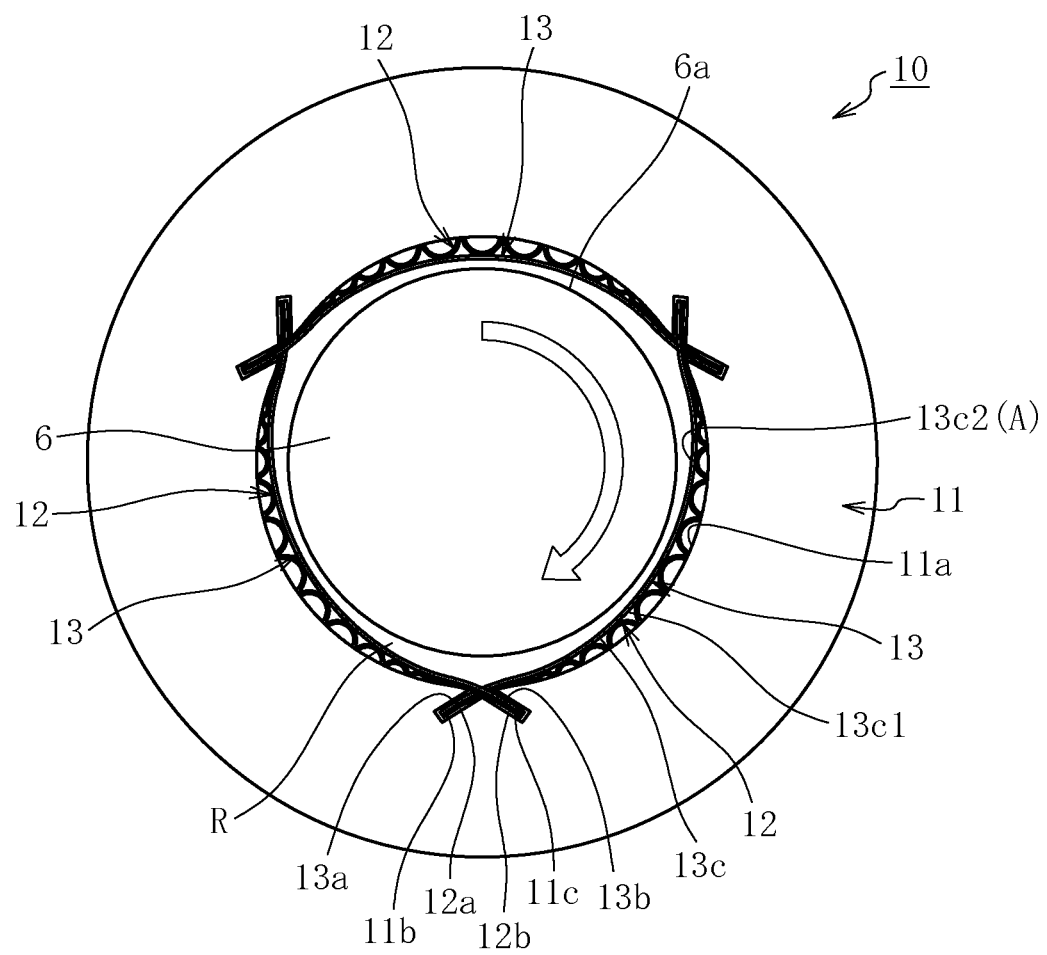
FIG. 14 is an axial front view of a foil bearing according to yet another embodiment of the present invention.
Figure 16:
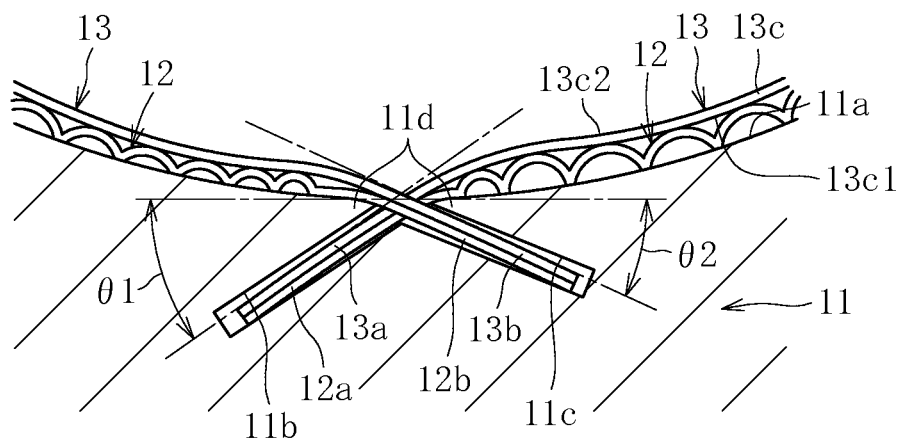
FIG. 16 is an enlarged sectional view of the foil bearing of FIG. 14.

The foil bearing 10 illustrated in FIG. 14 comprises the outer member 11 that is fixed on the inner circumference of the housing (not shown) and has the inner circumference on which the shaft 6 is inserted, a plurality of foils 13 (top foils) mounted to the inner circumferential surface 11a of the outer member 11, and elastic members interposed between the inner circumferential surface 11a of the outer member 11 and the foils 13 so as to impart elasticity to the foils 13. In the case described in this embodiment, back foils 12 correspond to the elastic members. The circumferential end portions of the adjacent foils 13 (in this embodiment, holding portions 13a and 13b) are formed to intersect with each other in the axial view (refer to FIG. 16). The holding portions 13a and 13b of each of the foils 13 are arranged on the radially outer side with respect to the body portion 13c of the adjacent foil 13.

Figure 15A:
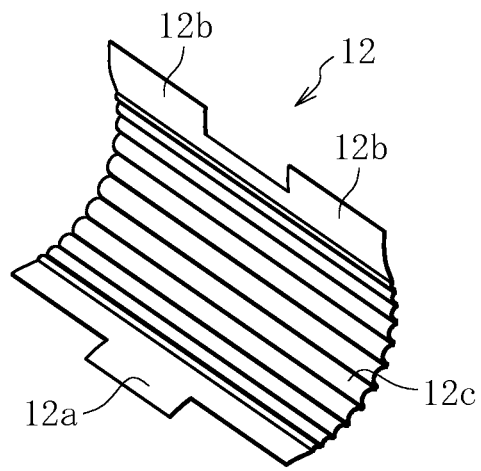
FIG. 15 (a) is a perspective view of a back foil that is used in the foil bearing of FIG. 14.
Figure 15B:
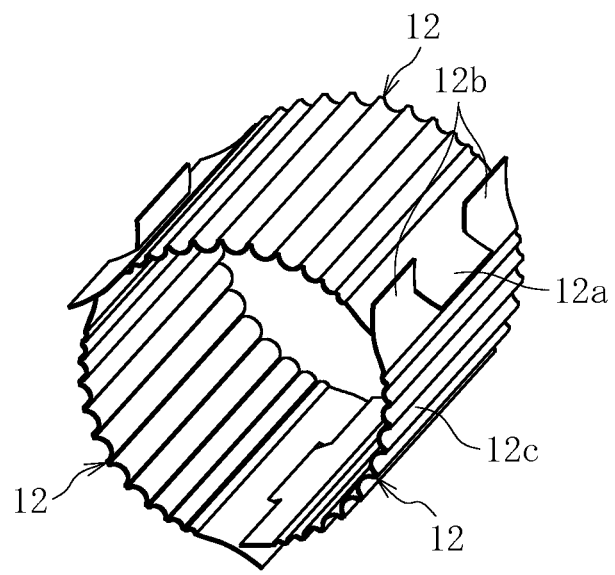

As illustrated in FIG. 15 (a), the back foil 12 has substantially the same shape as that of the foil 13, and comprises holding portions 12a and 12b formed at both circumferential ends thereof, and a body portion 12c formed circumferentially between both the holding portions 12a and 12b. The holding portions 12a and 12b are each formed into a substantially flat plate shape, and the body portion 12c is formed into a shape that can be elastically deformed by a compressive force in the radial direction. In this embodiment, the body portion 12c is formed into a corrugated shape, and a height between ridges and furrows therein is gradually reduced from a circumferential central portion toward both ends of the body portion 12c. Similarly to the foils 13, in each of the back foils 12, the holding portion 12a formed at one end can be inserted between a pair of holding portions 12b formed at another end of the adjacent back foil 12 (refer to FIG. 15 (b)).

The foil bearing 10 is assembled as follows. First, three foils 13 each having substantially the same shape (refer to FIG. 4) and three back foils 12 each having substantially the same shape (refer to FIG. 15) are prepared and superimposed on each other in three pairs. Then, the holding portions 13a and 12a at the one end of the foil 13 and the back foil 12 superimposed on each other are inserted between pairs of the holding portions 13b and 12b formed at the another end of another pair of the foil 13 and back foil 12 so that the three pairs of the foils 13 and the back foils 12 are coupled to each other to form a ring. In this state, the holding portions 13a and 12a on the one side and the holding portions 13b and 12b on the another side in each of the pairs of the foils 13 and the back foils 12 are inserted to the fixing grooves 11b and 11c of the outer member 11. With this, the foils 13 and the back foils 12 are mounted to the inner circumferential surface of the outer member 11.

In the configuration described above, when the shaft 6 is rotated to the one side in the circumferential direction (direction of the arrow in FIG. 14), that is, in a shrinkage direction of the wedge-like radial bearing gap R, air films are formed between the bearing surfaces A of the foils 13 and the outer circumferential surface 6a of the shaft 6. When the pressures of the air films become higher, the end portions of the body portion 13c of each of the foils 13 are pressed to the radially outer side. As a result, the back foils 12 are elastically deformed and compressed in the radial direction. Then, the wedge-like radial bearing gaps R are formed at a plurality of positions (three positions in the illustrated example) in the circumferential direction around the shaft 6, and the shaft 6 is supported in a freely rotatable manner in the radial direction under a non-contact state with respect to the foils 13. In this state, the shapes of the foils 13 and shapes of the back foils 12 are maintained at positions at which elastic forces of the back foils 12 and the pressures of the air films to be formed in the radial bearing gaps R are counterbalanced. Note that, the widths of the radial bearing gaps R, which are actually as fine as approximately several tens of micrometers, are illustrated on an exaggerated scale in FIG. 14. Further, the foils 13 and the back foils 12 are flexible, and hence the bearing surfaces A of the foils 13 are arbitrarily deformed in accordance with the operating conditions such as the load, the rotation speed of the shaft 6, and the ambient temperature. Thus, the radial bearing gaps R are automatically adjusted to have appropriate widths in accordance with the operating conditions. As a result, even under the severe conditions involving high temperature and high speed rotation, the radial bearing gaps R can be managed to have optimum widths, and hence the shaft 6 can be stably supported.

In the foil bearing 10, the air films formed during the low speed rotation immediately before the stop of the shaft 6 or immediately after the actuation of the shaft 6 are difficult to have the thickness equal to or larger than the surface roughnesses around the bearing surfaces A of the foils 13 and the outer circumferential surface 6a of the shaft 6. Thus, the metal contact occurs between the bearing surfaces A of the foils 13 and the outer circumferential surface 6a of the shaft 6, which causes an increase in torque. In order to reduce the frictional force generated at this time so that the torque is reduced, it is desired that the coating (first coating) for reducing surface friction be formed on the any one or both of the bearing surface A (radially inner surface 13c2) of each of the foils 13 and the surface of the member that slides against the bearing surface A (in this embodiment, the outer circumferential surface 6a of the shaft 6). As this coating, there may be used, for example, the DLC film, the titanium aluminum nitride film, or the molybdenum disulfide film. The DLC film and the titanium aluminum nitride film can be formed through CVD or PVD, and the molybdenum disulfide film can be easily formed through spraying. In particular, the DLC film and the titanium aluminum nitride film are hard. Thus, when the coating is formed of those films, the abrasion resistance of the bearing surfaces A can also be enhanced. As a result, a bearing life can be prolonged.

Further, during operation of the bearing, due to the influence of the air films formed in the radial bearing gaps, the foils 13 and the back foils 12 are radially expanded overall to press the inner circumferential surface 11a of the outer member 11. In accordance therewith, the slight circumferential sliding occurs between the radially outer surfaces 13c1 of the foils 13 and radially inner surfaces of the back foils 12, between radially outer surfaces of the back foils 12 and the inner circumferential surface 11a of the outer member 11, and between the holding portions 13a, 13b, 12a, and 12b of the foils 13 and the back foils 12 and the fixing grooves 11b and 11c. As a countermeasure, the coating (second coating) is formed on any one or both of the radially outer surfaces 13c1 of the foils 13 and the radially inner surfaces of the back foils 12, which are held in contact with the radially outer surfaces 13c1, on any one or both of the radially outer surfaces of the back foils 12 and the inner circumferential surface 11a of the outer member 11, which is held in contact with the radially outer surfaces, on any one or both of the holding portions 13a and 13b of the foils 13 and the fixing grooves 11b and 11c, which are held in contact with the holding portions 13a and 13b, or on any one or both of the holding portions 12a and 12b of the back foils 12 and the fixing grooves 11b and 11c, which are held in contact with the holding portions 12a and 12b. With this, abrasion resistances at those sliding portions can be enhanced.

Note that, in order to exert a greater vibration damping effect, a somewhat great frictional force may be necessary at the above-mentioned sliding portions. Thus, frictional property of the second coating need not be significantly low. For those reasons, it is preferred that the DLC film and the titanium aluminum nitride film, which are larger in frictional coefficient but higher in abrasion resistance than the molybdenum disulfide film, be used as the second coating. Specifically, the molybdenum disulfide film is used as the first coating to be formed on the bearing surfaces A, and the titanium aluminum nitride, the DLC film, or the like is used as the second coating to be formed on the sliding portion between the foil 13 and the outer member 11. With this, frictional coefficients of both the coatings can be set to be different from each other. As a result, lower torque and higher vibration damping property can be simultaneously obtained.

In the foil bearing 10 of FIG. 14, the foils 13 illustrated in FIGS. 10, 11, and 13 may be used. In this case, the back foils 12 are the same as the foils 13 of FIG. 10 except that the body portions 12c are corrugated (not shown).

It is preferred that the back foils 12 have substantially the same shape as that of the foils 13 as described above. Thus, for example, when the foils 13 have the shapes illustrated in FIGS. 4 and 10, it is preferred that the back foils 12 have substantially the same shape as those shapes. Note that, in a case where the back foils 12 are mounted to the outer member 11 by means other than that for the foils 13, the back foils 12 need not have substantially the same shape as that of the foils 13.

Further, the elastic members are not limited to the back foils 12 as long as radially inward elasticity can be imparted to the foils 13. For example, there may be used an elastic body formed of wires that are woven into a mesh form.

In the cases described hereinabove, the three foils 13 are provided in the foil bearing 10, but the present invention is not limited thereto. Two foils 13, or four or more foils 13 may be provided.

Further, in the cases exemplified in the description hereinabove, the shaft 6 serves as a rotary side member, and the outer member 11 serves as a fixed side member. However, the configuration of FIG. 3 may be applicable as it is also to a reverse case where the shaft 6 serves as the fixed side member, and the outer member 11 serves as the rotary side member. Note that, in this case, the foils 13 serve as rotary side members, and hence the foils 13 need to be designed in consideration of centrifugal deformation of the foils 13 as a whole.

Figure 17:
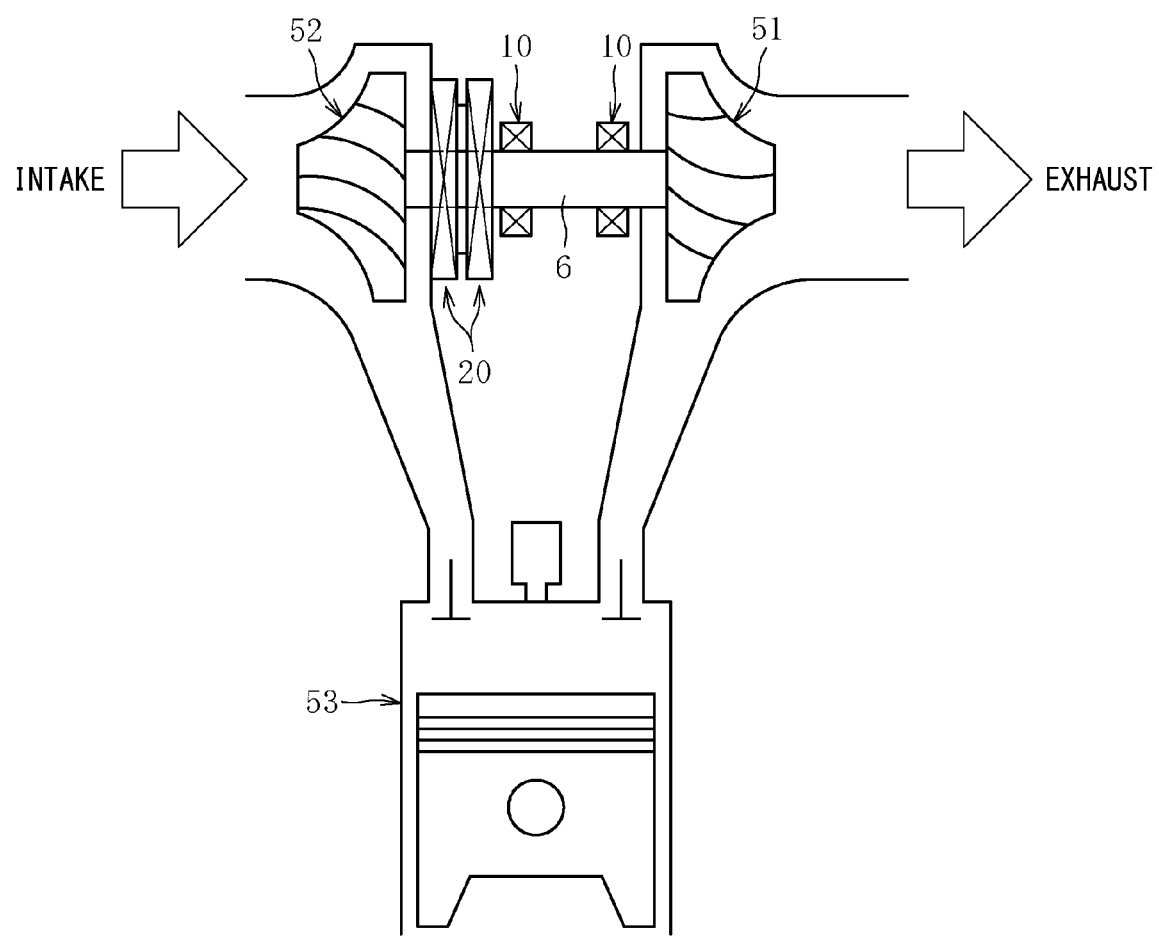
FIG. 17 is a schematic side view of a configuration of a supercharger.

The foil bearing 10 according to the present invention is applicable not only to the gas turbine described above, and may be used as a bearing for supporting a rotor of a supercharger, for example. As illustrated in FIG. 17, in the supercharger, a turbine 51 is driven with an exhaust gas generated in an engine 53, and a compressor 52 is rotated by a drive force thus generated, to thereby compress intake air. This configuration enables the engine 53 to generate higher torque and have higher efficiency. The turbine 51, the compressor 52, and the shaft 6 serve as a rotor, and the foil bearings 10 of the embodiments described above can be used as the radial bearings 10 for supporting the shaft 6.

The foil bearing according to the present invention can be used not only turbo-machines such as the gas turbine and the supercharger, but widely used also as bearings for vehicles such as an automobile, which are used under restrictions such as a difficulty in lubricating with a liquid such as a lubricating oil, a difficulty in separately arranging an auxiliary device of a lubricating oil circulatory system in view of energy efficiency, or problems that may be caused by shearing resistance of the liquid. The foil bearing according to the present invention can be widely used also as bearings for industrial devices.

Further, the foil bearings described above are each an air dynamic pressure bearing that uses air as a pressure generating fluid. However, the present invention is not limited thereto, and other gases or liquids such as water and oil may be used as the pressure generating fluid. In addition, unlike the exemplified cases where any one of the shaft 6 and the outer member 11 is used as a rotary side member and another of the shaft 6 and the outer member 11 is used as a fixed side member, both of those members may be used as rotary side members that are rotated at different speeds.

REFERENCE SIGNS LIST 10 foil bearing
11 outer member
11b, 11c fixing groove
13 foil
13a, 13b holding portion
13c body portion
A bearing surface
O circumferential central portion of body portion of foil
P peak position
R radial bearing gap
δ radial gap
θ1, θ2 rising angle of foil

The invention claimed is:
1. A foil bearing, comprising:
an outer member that has an inner circumferential surface having a cylindrical surface shape; and
a plurality of foils that are mounted to the inner circumferential surface of the outer member, the foil bearing being configured to radially support a shaft inserted on an inner circumference of the outer member in a freely relatively rotatable manner,
wherein the plurality of foils each comprise:
holding portions that are formed at both circumferential ends and held while in contact with the outer member; and
a body portion that is formed circumferentially between the holding portions and has a bearing surface,
wherein at least an end portion on one side in a circumferential direction of the body portion of each of the plurality of foils is raised radially inward with respect to the inner circumferential surface of the outer member, and
wherein a rising angle at the end portion on the one side in the circumferential direction of the body portion with respect to the inner circumferential surface of the outer member is smaller than a rising angle at an end portion on another side in the circumferential direction of the body portion with respect to the inner circumferential surface of the outer member.

2. The foil bearing according to claim 1, wherein at least the holding portion on the one side in the circumferential direction of the each of the plurality of foils is inserted to a fixing groove formed in the inner circumferential surface of the outer member.

3. The foil bearing according to claim 2, wherein the fixing groove is inclined radially outward to the one side in the circumferential direction.

4. The foil bearing according to claim 2, wherein at least the holding portion on the one side in the circumferential direction of the each of the plurality of foils comprises a projecting portion formed by extending an axial partial region of the body portion to the one side in the circumferential direction.

5. The foil bearing according to claim 4, wherein at least the holding portion on the one side in the circumferential direction of the each of the plurality of foils comprises a plurality of the projecting portions formed apart from each other in an axial direction.

6. The foil bearing according to claim 1, wherein at least one of the holding portions of the each of the plurality of foils is slidable against the outer member.

7. The foil bearing according to claim 1,
wherein circumferential end portions of an adjacent pair of the plurality of foils are intersected with each other in an axial view, and
wherein the circumferential end portions of the each of the plurality of foils are arranged on a radially outer side with respect to adjacent foils.

8. The foil bearing according to claim 1, wherein the holding portion on the one side in the circumferential direction of the each of the plurality of foils is held in a slidable state in a fixing groove formed in the inner circumferential surface of the outer member.

9. A turbo-machine, comprising the foil bearing according to claim 1.

10. A foil bearing, comprising:
an outer member that has an inner circumferential surface having a cylindrical surface shape; and
a plurality of foils that are mounted to the inner circumferential surface of the outer member, the foil bearing being configured to radially support a shaft inserted on an inner circumference of the outer member in a freely relatively rotatable manner,
wherein the plurality of foils each comprise:
holding portions that are formed at both circumferential ends and held while in contact with the outer member; and
a body portion that is formed circumferentially between the holding portions and has a bearing surface,
wherein at least an end portion on one side in a circumferential direction of the body portion of each of the plurality of foils is raised radially inward with respect to the inner circumferential surface of the outer member,
wherein circumferential end portions of an adjacent pair of the plurality of foils are intersected with each other in an axial view, and
wherein the circumferential end portions of the each of the plurality of foils are arranged on a radially outer side with respect to adjacent foils.

11. A foil bearing, comprising:
an outer member that has an inner circumferential surface having a cylindrical surface shape; and
a plurality of foils that are mounted to the inner circumferential surface of the outer member, the foil bearing being configured to radially support a shaft inserted on an inner circumference of the outer member in a freely relatively rotatable manner,
wherein the plurality of foils each have a bearing surface, and comprise circumferential end portions that are held while in contact with the outer member,
wherein the circumferential end portions of an adjacent pair of the plurality of foils are intersected with each other in an axial view, and
wherein the circumferential end portions of the each of the plurality of foils are arranged on a radially outer side with respect to adjacent foils.

* * * * *